United States Patent [19]
Tucker et al.

[11] Patent Number: 5,778,940
[45] Date of Patent: Jul. 14, 1998

[54] COMBINATION RUBBER/COMPOSITE HOSE

[75] Inventors: Peter N. Tucker, Greensboro; George D. Ohm, Salisbury, both of N.C.

[73] Assignee: HBD Industries, Inc., Bell Fontaine, Ohio

[21] Appl. No.: 661,654

[22] Filed: Jun. 11, 1996

[51] Int. Cl.$^6$ .................................... F16L 11/115
[52] U.S. Cl. ........................ 138/127; 138/121; 138/128; 138/129; 138/144; 138/151; 138/173
[58] Field of Search ........................... 138/121, 122, 138/124, 126, 127, 128, 129, 137, 144, 151, 154, 173

[56] References Cited

U.S. PATENT DOCUMENTS

| | | | |
|---|---|---|---|
| 97,853 | 12/1869 | Alden | 138/96 R |
| 2,597,806 | 5/1952 | Martin | 138/122 |
| 2,895,001 | 7/1959 | Noyes et al. | 138/122 |
| 2,913,011 | 11/1959 | Noyes et al. | 138/122 |
| 2,936,812 | 5/1960 | Roberts | |
| 2,939,488 | 6/1960 | Bacon | 138/126 |
| 2,986,169 | 5/1961 | McCormick | |
| 3,154,329 | 10/1964 | Skinner | |
| 3,470,917 | 10/1969 | Grosh | 138/127 |
| 3,500,869 | 3/1970 | Skoggard et al. | 138/125 |
| 3,604,461 | 9/1971 | Matthews | |
| 3,729,028 | 4/1973 | Horvath et al. | |
| 3,917,898 | 11/1975 | Iketani et al. | 138/126 |
| 4,153,079 | 5/1979 | Ambrose | |
| 4,445,543 | 5/1984 | Mead | |
| 4,499,926 | 2/1985 | Friberg | 138/126 |
| 4,537,224 | 8/1985 | Sumitani | |
| 4,567,916 | 2/1986 | Antal et al. | |
| 5,279,332 | 1/1994 | Winter | |
| 5,485,870 | 1/1996 | Kraik | |
| 5,608,963 | 3/1997 | Lefere | 138/109 |
| 5,611,374 | 3/1997 | Blin et al. | 138/121 |
| 5,654,499 | 8/1997 | Manuli | |

*Primary Examiner*—David Scherbel
*Assistant Examiner*—James F. Hook
*Attorney, Agent, or Firm*—David A. Tamburro

[57] ABSTRACT

A combination rubber/composite hose comprising an inner composite hose section and a surrounding outer rubber textile reinforced hose section sealingly fastened together at their ends, but free to shift longitudinally and bend with respect to each other.

9 Claims, 3 Drawing Sheets

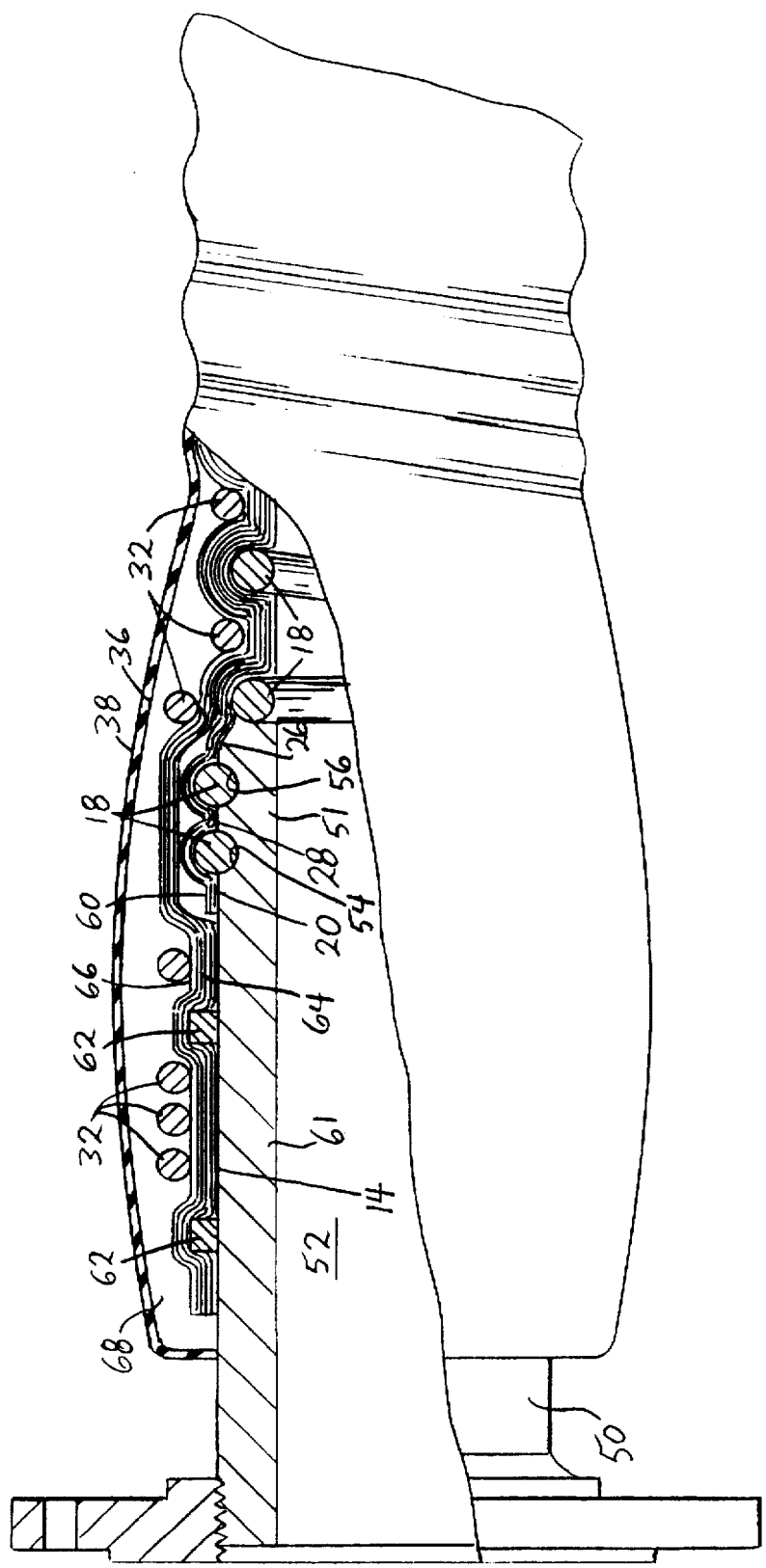

COMBINATION RUBBER/COMPOSITE HOSE

BACKGROUND OF THE INVENTION

This invention relates generally to heavy duty flexible hose used for example to load or unload crude oil and petrochemical refined products from tankers or barges to refinery or from a tank farm to tankers or barges. More particularly, the invention relates to a combination hose having a "Two Hose in One" construction which is flexible and lightweight and which includes a rubber exterior that improves coupling, reduces elongation, improves wear, and increases working pressure and burst strength.

Hoses used for this purpose can vary in diameter, e.g. from 4 inches to 10 inches, and in lengths up to about fifty feet. Individual lengths may be coupled together to provide any desired overall length.

In the past rubber textile reinforced hose has been most commonly used for this purpose because of its strength, wear resistance, and its ability to be attached to end fittings in leakproof fashion, but this type hose has poor flexibility, is heavy in weight, and is difficult to handle during an oil discharge operation. Also sometimes used is composite hose which comprises multiple layers of impregnated fabric spirally wound on an internal helix wire and contained between an external helix wire wound on the same pitch but centered between the internal helix wire. While the composite hose is lighter in weight, very flexible, and offers better handling characteristics, it is easily damaged in service and often stretches and elongates beyond industry standards. Also, metal fittings attached to the ends of a composite hose are difficult to seal and are prone to leakage.

Attempts have been made to provide combination hose which includes such an inner composite hose surrounded by an outer rubber textile reinforced casing. The assignee of this invention has previously sold such prior art combination hoses which were significantly better than each type hose alone, but those were not without problems. For example, in the inner composite tube the spirally wound fabric produced a very rough corrugated-like bore which caused fluid turbulence and reduced fluid flow rates. In addition, the transverse raw edges of the spirally wound fabric were exposed to and frayed by the high velocity fluid flowing through the tube, and the tube lost its integrity and leaked.

SUMMARY OF THE INVENTION

Accordingly, a primary object of this invention is to provide a novel combination rubber/composite hose which is flexible and lightweight and has a relatively smooth bore that eliminates turbulence at high pressures and high flow rates and which includes a rubber textile reinforced exterior that improves coupling, reduces elongation, improves wear, and increases working pressure and burst strength.

Another object is to provide the above novel combination hose wherein the inner composite hose section includes an internal wire helix, a first fabric layer extending longitudinally along the helix and having a width sufficient to wrap around the helix with its longitudinal edges overlapping, and a binding-in tape applied helically under tension around the fabric layer between the wire helix to form a substantially flat smooth surfaced bore through which the high pressure fluid flows.

Still another object of the invention is to provide the above novel combination hose wherein the inner composite hose section and the surrounding outer rubber textile reinforced hose section are fastened together at their ends within fittings, but are free to shift longitudinally with respect to each other and thus offer greater flexibility to the hose.

A further object of the invention is to provide the above novel combination hose wherein the ends of the hose are sealed within end fittings to prevent leakage and wicking of fluid from the bore.

Further objects and advantages will become apparent from reading the following detailed description of the invention wherein reference is made to the accompanying drawings in which like numerals indicate like elements.

BRIEF DESCRIPTION OF THE DRAWINGS

FIG. 4 is a view similar to FIG. 3, but showing the hose with an integral built-in type fitting.

DETAILED DESCRIPTION OF THE INVENTION

Figure 1:
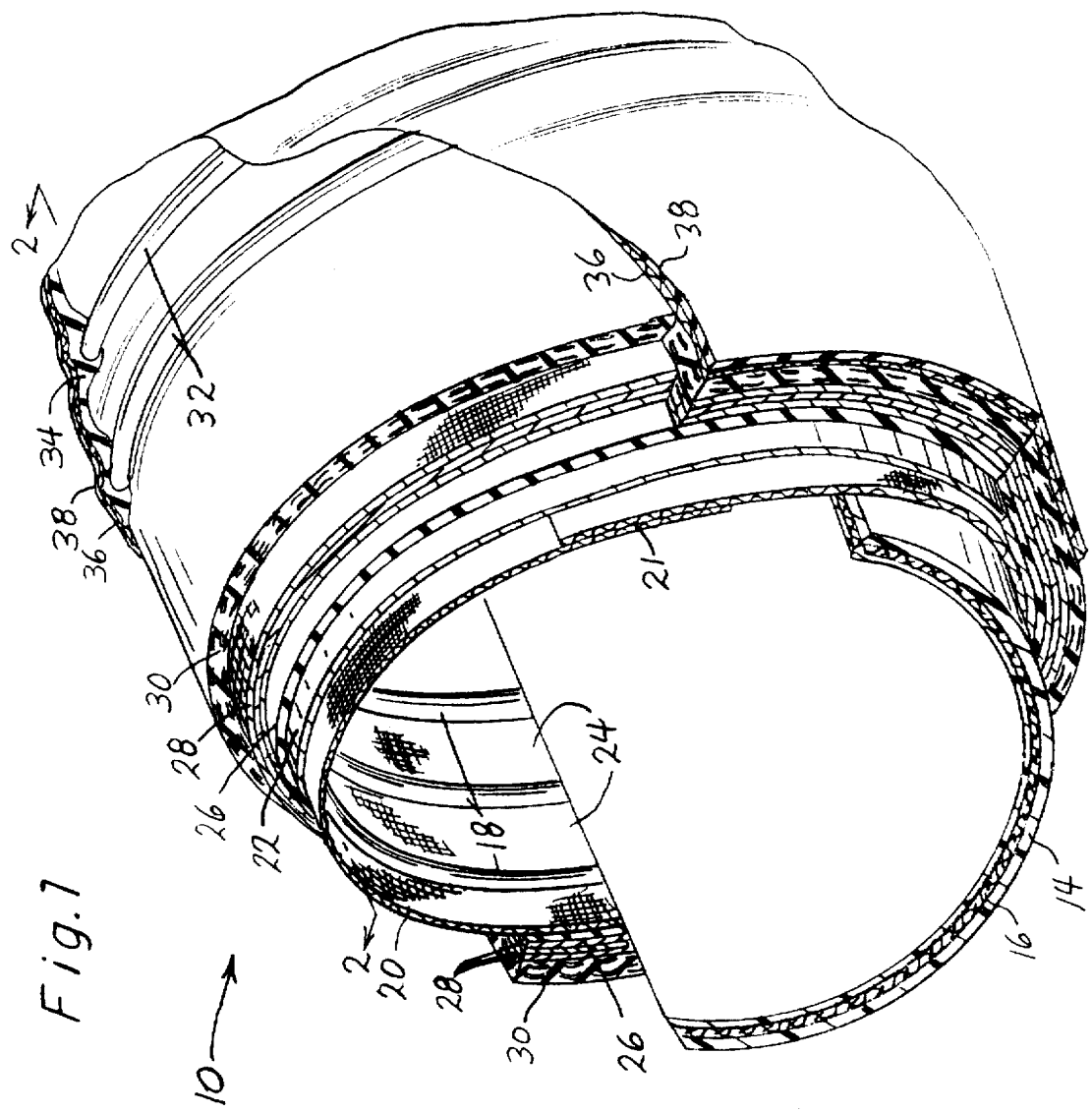
FIG. 1 is a partially fragmented perspective view of the novel combination rubber/composite hose of the invention.

The novel combination hose 10 will be described as the components are assembled, for example, on an 8 inch mandrel 12 of a given length, e.g. fifty feet.

On each end of mandrel 12 a synthetic liner 14 is spirally wound with about 50% overlap a distance of 12 inches in from the end. The liner may be nitrile or FKM having a width of six inches and a thickness of 0.047 inches, thus providing a total thickness of 0.094 with the overlap. Next an open weave polyester frictioned breaker 16 of 0.035 inches thick is spirally applied with no overlap over liner 14, with the ends of breaker 16 spaced inwardly from the ends of liner 14 to prevent wicking into breaker 16.

Next an internal helix carbon steel wire 18 of about 0.244 inches diameter and 60/65 ton tensile is spirally wound on a predetermined pitch, e.g. about 1½ inches for a eight inch hose, from one end around breaker 16 and liner 14 along and onto the exposed length of mandrel 12 and onto the breaker 16 and liner 14 at the other end of the mandrel.

A first layer 20 of nylon fabric, about 0.012 inches thick and 5.18 oz/yd.sq. is applied longitudinally along the full length of the mandrel and is wide enough, e.g. thirty-three inches wide, to wrap around helix wire 18 with about a two inch overlap at the edges (4 inches total) to form a tube encircling wire 18 with an overlapping longitudinal edge 21 extending in the direction of fluid flow, rather than across or against the direction of flow as occurs with the transverse raw edges of a conventionally spirally wound fabric.

Figure 2:
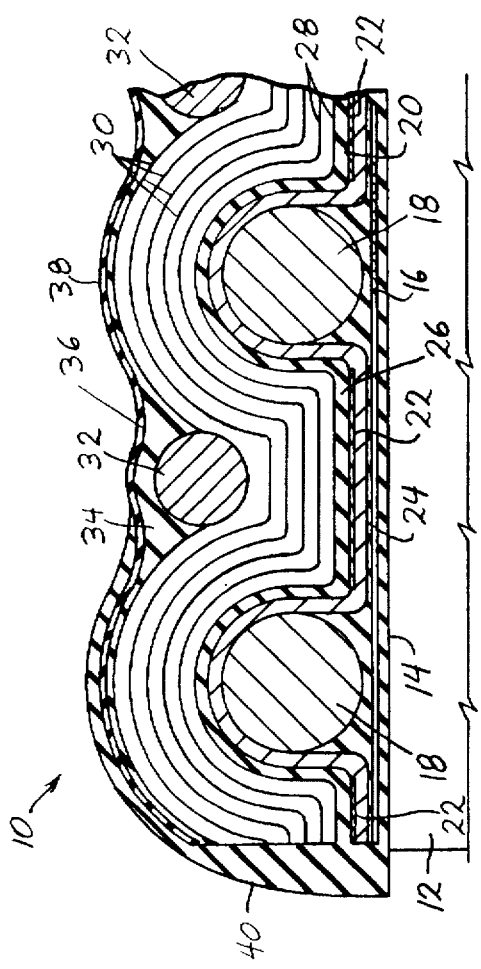
FIG. 2 is a fragmentary sectional view taken along line 2—2 of FIG. 1 through the top of the wall of the hose illustrating an end configuration for use with a swage type fitting.

A one inch wide cotton fabric binding-in tape 22 is next applied around layer 20 between wire helix 18 under tension to force fabric 20 to form a substantially flat surface 24 between the wire helix as viewed in FIG. 2 and therefor form a substantially smooth surfaced bore along the hose formed by wire helix 18 and the flattened fabric surface 24. The smooth surfaced bore and the absence of any raw fabric edges substantially eliminate turbulence and increase flow rates without loss of flexibility.

A 6 inch wide, 0.007 inch thick strip 26, type UHMW-PE available from Dixon Furon Industries, is spirally wound around layer 20 with a triple overlap, or total thickness of 0.021 inches. During subsequent vulcanization the strip material 26 flows together to form a seamless tube or fluid barrier layer around fabric layer 20.

Next a layer 28 of nylon fabric, 0.005 inches thick and 3.0 oz/yd.sq., is spirally wound around strip 26 with a 50% overlap.

Thus the inner composite hose section constitutes the elements described thus far, i.e. wire helix 18, fabric layer 20, binding-in tape 22, barrier layer 26, and fabric layer 28.

A plurality of tire textile cord reinforcement layers 30 are next applied spirally in opposite directions around fabric layer 28. Each layer 30 has a bare cord thickness of about 0.030 inch and is skim coated on both faces with a 0.012 thick bonded rubber filler coat to produce an overall thickness of 0.042 inches.

An external wire helix 32 is next applied around layers 30 and centered between the internal wire helix 18, under tension to force layers 26, 28, and 30 into the corrugated form shown in FIG. 2. Filler rubber 34 is next applied over and between helix wire 32, a polyester breaker fabric 36 is spirally wound around the entire carcass, and an outer rubber cover 38 is spirally wound around breaker fabric 36.

In the configuration of FIG. 2, when forming liner 14 on mandrel 12 an excess of material is provided at the outer end of the liner and that material is then folded back around the ends of the various components to form a sock 40 which encapsulates and seals off those components. Any seepage or wicking of the fluid being conveyed is trapped within layer 20.

The entire hose 10 is then vulcanized while on mandrel 10 to cause the material of liner 14 and sock 40 to flow together into tubular form. Similarly, barrier layer 26 flows together forming a seamless tube, as does outer rubber cover 38, and rubber filler 34 flows around wire helix 32. Also skim coated cord layers 30 bond together.

Because fabric layer 28 has a very close weave there is no bonding with the adjacent skim coated cord layer 30. Consequently the inner composite hose section (components 18, 20, 22, 26 and 28) and the outer reinforced rubber section (components 30, 32, 34, 36 and 38) are free to shift and bend relative to each other, and this enhances the flexibility of the finished hose.

Figure 3:
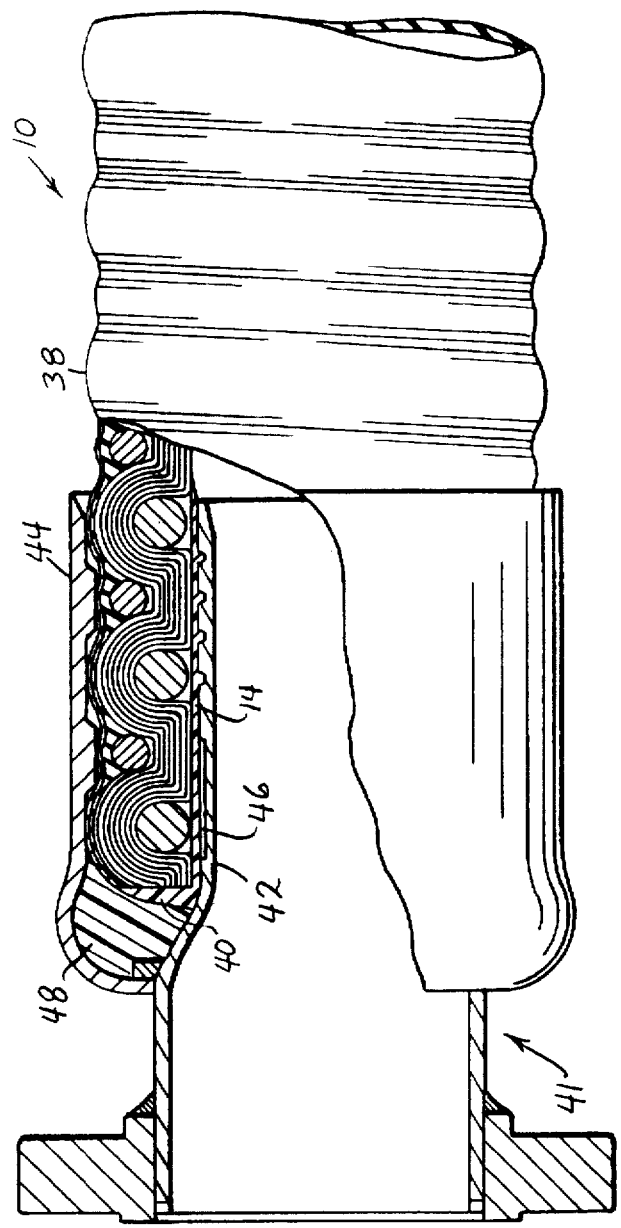
FIG. 3 is a fragmentary sectional view of the hose showing the end of the hose in a swage type fitting.

FIG. 3 illustrates the end configuration of FIG. 2 connected to a swage type fitting 41. The fitting includes an inner nipple stem 42 which fits within liner 14 and an outer ferrule 44 surrounding cover 38 and sock 40. An annular seal 46 of the same material as liner 14 extends around stem 42.

The swaging operation is two fold. First the nipple stem 42 is expanded internally by pulling a steel die through the stem. This step ensures that the nipple is pressed up against the liner 14 and that pressure is exerted between the nipple seal 46 and the liner, the penetration of the nipple stem into the liner being approximately 3/32 inches. This expansion ensures concentricity of the nipple stem and the inner hose section. The second operation swages or reduces ferrule 44 through a set of steel dies, and compression is induced between the inner hose section and the outer hose section and between nipple stem 42 and the ferrule 44. Because the outer hose section includes rubber and textile components, penetration of ferrule 44 into the outer hose body can be adjusted between 15 and 20% to achieve higher retention value when compared to conventional composite constructions. Sealing is also enhanced because of the compression of metal to rubber surfaces diminishing the possibility of leaks at the connection of fitting to hose. The pocket 48 developed between the hose and the ferrule 44 can be filled with epoxy for even better sealing and fitting containment.

Because the internal hose section is not bonded to the outer hose section and components 28 and 30 can slide with respect to each other, the hose sections adjust more readily to tight bend radii. The outer hose section components 30, 32, 34, 36 and 38 are the strength components to cater to working pressure, safety factor and restrict elongation of the two-in-one construction. The external helix wire 32 is buried in a cushion of rubber 34 and protected by the fabric breaker 36 and rubber cover 38, thus preventing snagging and damage to this critical component. Hence, the hose 10 offers longer life in more demanding applications. Flow rates are better than composite hose alone, weight and flexibility match composite hose construction throughout hose diameter range and most importantly hose 10 can be designed to meet very high working and burst pressures which can not be obtained in composite hose alone because they lack the tire cord strength components 30.

The combination hose construction of FIG. 4 is the same as that described above, except for the configuration of the ends of the hose which are designed to accommodate a built-in fitting 50 which has long been the preferred method of end termination in hand built hose constructions.

The innermost end 51 of the nipple 52 contains the inner hose section which comprises fabric layers 20 and 28 and barrier layer 26. The internal helix wire 18 is first applied over the mandrel with the correct pitch and continues up and over nipple end 51. The end is machine grooved at 54 and 56 to seat at least two coils of helix wire 18 which is circumferentially welded in place, the ends of the inner hose section are passed over helix wire 18 and are encapsulated in an epoxy encasement 60. This serves the same purpose as the synthetic liner sock 40 which encapsulates the finished hose end in FIG. 2. No seepage (wicking) can go beyond this area and into the rubber hose body. Excellent adhesion is obtained between the epoxy encasement 60 and the nipple end 51.

The outer end 61 of fitting 52 has a pair of annular fitting bands 62 welded thereon, and a suitable rubber to metal bonding cement is applied around the outer end up to but short of the epoxy encasement area 60. A synthetic liner such as liner 14 is wrapped around this outer end over bands 62, and the cords 30 are spirally applied in opposite directions over liner 14. With all cords 30 in place, the binding-in wires 64 are wound around cords 30 under tension to position and constrict the cords in place over bands 62. A rubber strip 66 is helically applied over the binding-in wire 64 and over the complete length of hose. The other fitting end is processed in the identical manner to the foregoing.

The external wire helix 32 is applied under tension between the pitch of the internal wire helix and over the epoxy encasement 60 and in between bands 62. Filler rubber 68 is applied over and around the external helix 32 over the entire hose length and other fitting. Fabric breakers 36 and rubber cover 38 are then applied to complete the hose building process. Nylon tape is applied under tension to the entire hose with this construction or with the construction shown in FIG. 2. During the vulcanization process the nylon tape shrinks and consolidates all the outer hose section components. Also the barrier layer 26 melts and flows together to form a seamless tube.

This fitting attachment is often preferred by most customers. It affords better strength at fitting-to-hose junction and there is more rubber placed over the fitting because of the binding-in wire 64 and the outer helix wire 32 positioned over a larger diameter. Weight and flexibility of the hose body remain the same as ordinary composite hose, but toughness and long life are much greater.

Because of the barrier layer 26 made from UHMW-PE, the combination hose of the invention offers chemical, oil and solvents compatibility over a very large range of products used in industry. The hose is lightweight, flexible, tough and withstands high working pressure, all of which are highly desirable characteristics.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A flexible, high strength fluid conveying hose comprising an inner composite hose section and an outer reinforced rubber section including a rubber layer surrounding said inner section, said inner section including an inner wire helix spirally wound along the length of the hose, a first fabric extending longitudinally along said wire helix and having a width sufficient to substantially encircle said wire helix, a strip of material spirally wound around said first fabric between said wire helix under tension and having a width sufficient to form said first fabric into a substantially flat surface between said helix and provide therewith a substantially smooth surfaced bore through which fluid passes in contact with said first fabric and said helix.

2. The hose defined in claim 1, wherein the edges of said first fabric overlap longitudinally in the direction of fluid flow.

3. The hose defined in claim 2, said inner section further comprising a tubular barrier layer surrounding said first fabric, and a second fabric layer surrounding said barrier layer.

4. The hose defined in claim 3, said outer reinforced rubber section including a plurality of textile reinforcing layers surrounding said second fabric layer and an external wire helix spirally wound around said reinforcing layers between said internal wire helix under tension to force said reinforcing layers, said second fabric layer, and said barrier layer into a corrugated form.

5. The hose defined in claim 4, wherein said second fabric layer and the adjacent reinforcing layer are relatively shiftable so that the inner and outer hose sections are moveable with respect to each other to enhance the flexibility of the hose.

6. The hose defined in claim 5, wherein the ends of said inner and outer sections are sealed together.

7. The hose defined in claim 6, comprising an inner rubber liner within said inner wire helix at each end of said inner composite section.

8. A flexible, high strength fluid conveying hose comprising an inner composite hose section and an outer reinforced rubber section including a rubber layer surrounding said inner section, said inner section including an inner wire helix spirally wound along the length of the hose, a first fabric layer extending along and encircling said wire helix, a strip of material spirally wound around said first fabric layer between said wire helix under tension and having a width sufficient to form said first layer into a substantially flat surface between said helix and provide therewith a substantially smooth surfaced bore through which fluid passes in contact with said first fabric and said helix.

9. The hose defined in claim 8, wherein the first fabric layer includes a single piece of fabric which extends longitudinally along said wire helix and the edges of said single piece of fabric overlap longitudinally in the direction of fluid flow.

* * * * *